Feb. 2, 1971    A. R. LUDWIG    3,559,495
GEARLESS MULTIPLE SPINDLE DRIVE
Filed March 12, 1969    2 Sheets-Sheet 2
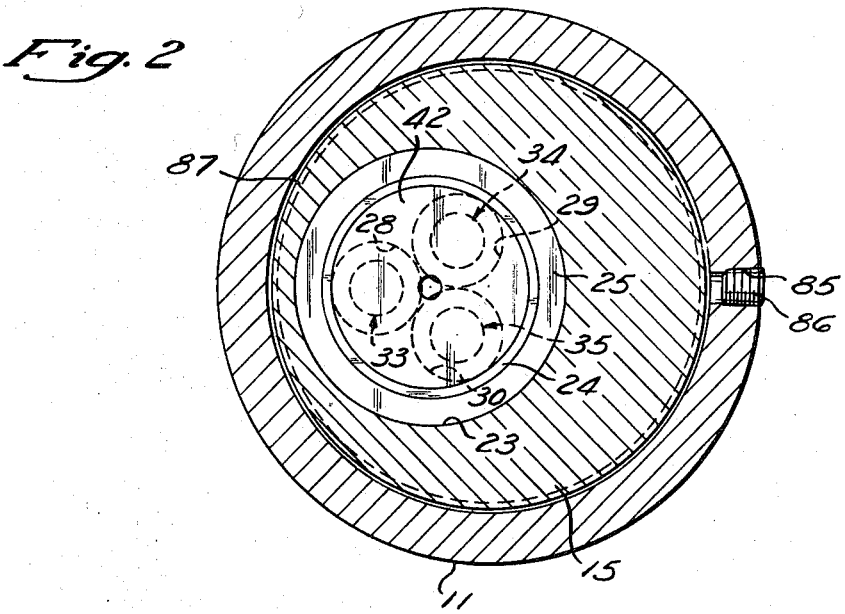
INVENTOR
ALBERT R. LUDWIG
BY
McNENNY, FARRINGTON, PEARNE & GORDON
ATTORNEYS

# United States Patent Office 3,559,495
Patented Feb. 2, 1971

3,559,495
GEARLESS MULTIPLE SPINDLE DRIVE
Albert R. Ludwig, Cleveland, Ohio, assignor to
Zagar, Inc., a corporation of Ohio
Filed Mar. 12, 1969, Ser. No. 806,400
Int. Cl. F16h 21/12
U.S. Cl. 74—63　　8 Claims

ABSTRACT OF THE DISCLOSURE

A gearless multiple spindle drive which includes a drive crank having a drive shank and a crank body is disclosed. The crank body is provided with an eccentric crank socket which is offset from the center of the drive shank to establish the throw of the drive crank. An oscillator plate is received in the socket for oscillatory rotation relative to the crank body and for non-rotative, circular, translatory motion relative to surrounding space. A plurality of driven cranks are drivingly engaged by the oscillator plate and have the same throw as the drive crank. The driven cranks have shanks which are carried by a housing. The housing is restrained against rotation. Bearings rotatably support the drive crank on the housing.

BACKGROUND OF THE INVENTION

Gearless multiple spindle drill heads have been proposed as attachments for drilling machines to perform drilling, reaming, tapping, and boring operations. Such multiple spindle working techniques permit random or symmetrical hole patterns at close and accurate center spacing for repetitive operations. Heretofore, such gearless multiple spindle drill heads have been proposed which include a drive crank which is turned by the drilling machine to which the head is attached, oscillator drive means which may include a counterbalanced drive plate driven by the drive crank for oscillatory rotation relative to the crank body and for non-rotative, circular translatory motion relative to surrounding space, and a plurality of driven cranks drivingly engaged by the oscillator plate and having shanks carried by a housing. In order to permit non-symmetrical spacing of the driven cranks relative to the drive crank and to stabilize the oscillatory rotation of the oscillator means, idler cranks are provided between the oscillator means and the housing.

Since the oscillator means provided in these prior art drill heads are unrestrained laterally, it was necessary to carefully counterbalance the oscillator means to prevent vibrations within the drill heads. Even so, the vibrations in the drill head were a problem in high speed drilling operations, such as drilling holes in printed circuit boards. Furthermore, such prior art drill heads required thrust bearings or, more commonly, bearing pads between the rotating oscillator plate and the drill head housing to receive thrust from the work-engaging driven spindles. Since the surface-to-surface motion between the oscillator plate and the housing is non-rotative, circular, translatory motion, the bearings or pressure pads were subjected to considerable wear.

SUMMARY OF THE INVENTION

This invention provides a gearless drill head which minimizes or eliminates vibration problems within the drill head, even during high speed drilling or other similar working operations. The drill head according to this invention also eliminates the need for bearings or pressure pads between the housing and oscillator plate, and further eliminates the need for idler crank arms between these members.

According to this invention, a gearless drill head includes a drive crank having a drive shank and a crank body. The crank body is provided with an eccentric crank socket which is offset from the center of the drive shank to establish the throw of the drive crank. An oscillator plate is received within the eccentric crank socket for oscillator rotation relative to the crank body and for non-rotative, circular, translatory motion relative to surrounding space. A plurality of driven cranks with the same throw as the drive crank are drivingly engaged by the oscillator plate. The crank body is received within a housing which is restrained against rotation and which carries the shanks of the driven cranks. Bearing means are provided between the housing and the crank body so that constraints imposed on the oscillator plate by the surrounding crank body, which is in turn constrained by the bearing means for the drive crank, resist the tendency of centrifugal force at high rotational speeds to cause slight increases in the throw radii of the drive crank and the driven cranks. For lighter working operations, the bearings between the housing and the crank body may be radial bearings so that the thrust from working operations is transmitted directly to the drive shank and to the quill of the machine. For heavier working operations, combination thrust and radial bearings may be employed to transmit at least a portion of the thrust through the housing and then to the machine quill.

According to a further aspect of this invention, a lubricating oil reservoir is formed by the housing and means are provided on the crank body to pump oil to upper bearings in the drill head. The oil pump means according to this aspect of the invention may comprise screw threads on the outer surface of the crank body.

According to a still further aspect of this invention, the constraint against rotation of the housing means may be releasable to allow adjustment of the angular position of the housing means to thus change the angular position of the array of multiple spindles associated with the driven crankshafts.

BRIEF DESCRIPTION OF THE DRAWINGS

FIG. 2 is a cross sectional view, the plane of the section being indicated by the line 2—2 in FIG. 1.

DETAILED DESCRIPTION OF THE PREFERRED EMBODIMENT

Figure 1:
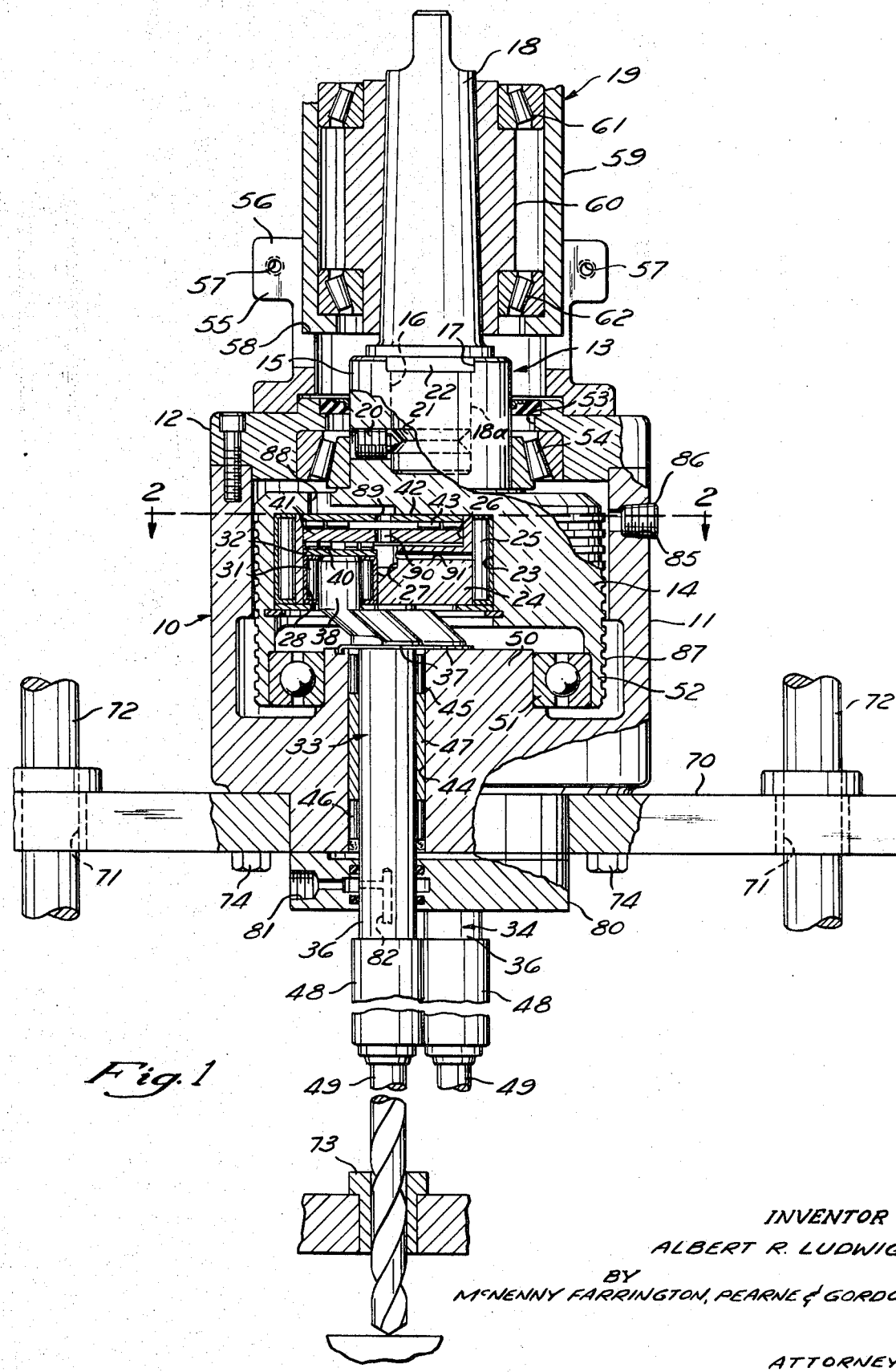
FIG. 1 is an elevational view, partly in section, of a multiple spindle drill head embodying the invention.

In the accompanying drawings, the invention is illustrated as a multiple spindle head for drilling operations. It is to be understood, however, that the invention may be employed for other working operatings such as, for example, reaming, tapping, and boring.

Referring now to the drawings, a gearless drill head 10 comprises a cup-shaped housing 11 which is closed by a top plate 12. The spindle drive mechanism includes a drive crank 13 which is formed by a cylindrical crank body 14 and a coaxial, cylindrical drive shank 15. The drive shank 15 is provided with an axial bore 16 and has a diametrically extending slot 17 cut into its upper surface. The bore 16 of the drive shank 15 receives a machine spindle 18 which, in turn, is received by a quill 19 of a drilling machine (not shown). The spindle 18 has a reduced end portion 18a which is received by the bore 16 and is restrained against axial movement by a setscrew 20 which extends through the sidewall of the drive shank 15 and into engagement with a circumferential groove 21 in the spindle 18 to prevent the spindle from moving axially relative to the drive shank 15. The spindle 18 also includes diametrically opposed flanges 22 which are received within the slot 17.

The crank body 14 is provided with an eccentric cylindrical crank socket 23 which is offset from the axis of the drive shank 15 to establish the throw of the drive crank 13. The eccentric crank socket 23 receives oscillator means which comprises an oscillator plate 24 which is mounted for oscillatory rotation relative to the crank body 14 and for nonrotative, circular, translatory motion relative to surrounding space by a roller bearing assembly 25. The oscillator plate 24 is provided with an upper cylindrical bore 26 which extends part way into the plate 24 and is further provided with a counterbore 27. A plurality of crank receiving sockets 28, 29, and 30 are drilled through the oscillator plate 24 and communicate with the bore 26. In each socket 28–30 there is provided a roller bearing assembly 31 and each socket 28–30 is closed by a circular thrust bearing plate 32.

A plurality of cranks 33, 34, and 35 are driven by the oscillator plate 24. Each driven crank 33–35 has a shank 36, an integral crank flange 37, and a crank pin 38 which has an axis that is offset radially from the axis of the shank 36 the same distance that the axis of the socket 23 is offset from the axis of the drive shank 15.

Each crank pin is received in its own one of the bores 28–30 and within the bearing assembly 31 provided therein. The head of each crank pin 38 bears against one of the circular thrust plates 32. Thrust bearings 40 are provided between each thrust plate 32 and an intermediate thrust plate 41 which is received within the bore 26. The bore 26 is closed by an upper thrust plate 42 and thrust bearings 43 are provided between the intermediate thrust plate 41 and the plate 42. Each shank 36 is journalled in its own one of a plurality of bores 44 which extend through the housing by radial bearings 45 and 46, which are separated by spacer sleeves 47. At their lower ends, each of the shanks 36 has a suitable clamping collet 48 detachably secured thereto for securing a tool such as a drill bit 49.

The housing 11 is provided with an inner axially extending and cylindrical boss 50. The inner race of a ball bearing assembly 51 is mounted on the cylindrical sidewall of the boss 50. The outer race of the ball bearing assembly 51 is fixed to an annular extension 52 of the crank body 14. The drive shank 15 extends through an opening 53 in the cover plate 12 and is rotatably mounted in the opening 53 by a combination thrust and radial bearing 54. For heavier drilling operations, the bearing 54 transfers some of the upward thrust from the driven cranks 33 to the cover plate 12 and then to a column clamp 55 which is bolted to the cover plate 12. The remaining thrust is tranferred directly through the drive shank 13 to the machine spindle 18. The column clamp 55 comprises a ring having axially extending slots 56 therein which permit the ring to be compressed against the quill 19 by threading bolts through holes 57 in the column clamp 55. The column clamp 55 has a stepped portion 58 which butts against the lower end of an outer stationary portion 59 of the quill 19. The quill 19 also includes an inner rotatable portion 60 which rotates with the spindle 18. Combination thrust and radial bearings 61 and 62 are provided between the portions 59 and 60 of the quill 19. The bearings 61 and 62 are adapted to receive thrust loads in either axial direction.

The spindle 18 drives the drive shank 13 and the crank body 14 about their axes to thereby drive the oscillator plate 24 in oscillatory rotation relative to the crank body 14 and in non-rotative, circular, translatory motion relative to surrounding space. Since the driven cranks 33 have the same throw as the drive cranks established by the eccentric crank socket 23, the shanks 36 are driven about their axes. The bearings 51 and 54 constrain the crank body and the oscillator plate 24 so that the constraints imposed upon the oscillator plate 24 resist the tendency of centrifugal force at high rotational speeds to cause slight increases in the throw radii of the driven cranks 33, and further resist vibrations of these elements at high rotational speeds.

The drill head 10 is guided toward and away from a workpiece by a guide fixture which includes a plate 70 fixed to the lower end of the housing 11. The plate 70 is provided with bores 71 which receive vertical guideposts 72. The guideposts 72, together with the column clamp 56, hold the housing 11 against turning movements while it is being moved up and down and also align the head 10 with the work-holding jig (not shown) and a drill guide bushing fixture 73.

The orientation of the drill pattern on the workpiece may be changed by removing bolts 74 which fix the plate 70 to the housing 11, turning the housing 11 to a desired orientation, and then replacing the bolts 74 in other holes in the housing 11. The pattern orientation may also be changed by moving the vertical guideposts 72 relative to the bed of the machine and then fixing the posts to the bed when a desired orientation is achieved.

As was previously indicated, the combination radial and thrust bearing 54 may be employed for heavy working operations to transfer some of the axial thrust through the plate 12, the column clamp 55, to the fixed portion 59 of the quill 19. The remaining thrust is transferred directly through the crank body 14 to the spindle 18. For lighter working operations, the bearing 54 may be replaced with a radial bearing, such as a ball bearing assembly, to transfer all of the thrust from the crank body 14 to the spindle 18. In such an arrangement, no loads are placed on the housing 11 or its plate 12, and the housing 11 and its plate tend to float relative to the thrust.

The drill head 10 may also be provided with a coolant manifold 80 having an inlet port 81 which delivers coolant to a passageway 82 in each shank 36 and then to a passageway (not shown) in each drill.

There is provided in the head 10 a lubricating system for the bearings contained within the head. A lubricant reservoir is formed by the housing 11 and its cover plate 12, and this reservoir is partly filled with lubricating oil through a passage 85 which is covered by a plug 86. The outer cylindrical sidewall of the crank body is provided with screw threads 87 which pump lubricating oil upwardly upon rotation of the crank body to supply lubricant to the bearing assembly 54. Lubricating oil is returned to lower portions of the reservoir through a passageway 88 in the crank body 14, which extends from the bearing assembly 54 to an aperture 89 in the thrust plate 42. Lubricant may then flow to the bearings 43 and through an aperture 90 in the intermediate thrust plate 41. Lubricant may then flow to the bearings 40 and into the counterbore 27 in the crank body 24. Radial passageways 91 permit the lubricant to flow from the counterbore 27 through the bearings 25 and then to lower portions of the reservoir. Lubricant may also flow from the counterbore 27 to the bearings 31 in each socket 28, since the sockets 28 communicate with the counterbore 27.

The invention is not restricted to the slavish imitation of each and every detail set forth above. Obviously, devices may be provided which change, eliminate or add certain specific details without departing from the scope of the invention.

What is claimed is:

1. A gearless multiple spindle drive including a drive crank comprising a drive shank and a crank body having an eccentric crank socket offset from the center of the drive shank to establish the throw of the drive crank, oscillator means received in said socket for oscillatory rotation relative to said crank body and for non-rotative circular translatory motion relative to surrounding space, the radii of the circular paths of translation of points on the oscillator means being the same as the throw radius of the drive crank, a plurality of driven cranks with the same throw as the drive crank and drivingly engaged by said oscillator means, housing means restrained against rotation and carrying the shanks of the driven cranks, bearing means between said housing means and said crank body to rotatably support the crank body, whereby constraints imposed on said oscillator means by the surrounding crank body portion of the drive crank, which is in turn constrained by said radial bearing means for the drive crank, resist the tendency of centrifugal force at high rotational speeds to cause slight increases in the throw radii of the drive crank and the driven cranks.

2. A gearless multiple spindle drive including a drive crank comprising a drive shank for driven engagement with a machine spindle and adapted to transmit thrust thereto and a crank body having an eccentric crank socket offset from the center of the drive shank to establish the throw of the drive crank, oscillator means received in said socket for oscillatory rotation relative to said crank body and for non-rotative circular translatory motion relative to surrounding space, the radii of the circular paths of translation of points on the oscillator means being the same as the throw radius of the drive crank, thrust receiving means at the base of said crank socket, a plurality of driven cranks with the same throw as the drive crank and drivingly engaged by said oscillator means and engaging the thrust receiving means in the axial direction, housing means restrained against rotation and carrying the shanks of the driven cranks and carrying radial bearing means which rotatably support the drive crank at a first radial bearing toward the drive shank end of the drive crank and at a second radial bearing toward the crank body end of the drive crank, whereby constraints imposed on said oscillator means by the surrounding crank body portion of the drive crank, which is in turn constrained by the said radial bearing means for the drive crank, resist the tendency of centrifugal force at high rotational speeds to cause slight increases in the throw radii of the drive crank and the driven cranks.

3. A gearless multiple spindle drive as in claim 1 in which the housing means and the oscillator means float axially with respect to thrust strains in the drive crank and the driven cranks.

4. A gearless multiple spindle drive as in claim 1 in which part of the axial thrust is transmitted directly to the machine spindle through said crank body and in which the remainder of the axial thrust is transmitted to the housing.

5. A gearless multiple spindle drive as in claim 1 in which the constraint against rotation of the housing means is releasable to allow adjustment of the angular position of the housing means to thus change the angular position of the array of multiple spindles associated with said driven crank shank.

6. A gearless multiple spindle drive as in claim 1 in which means are provided to pump lubricating fluid from a reservoir defined by said housing means to said oscillator means within said eccentric crank socket.

7. A gearless multiple spindle drive as in claim 6 wherein said lubricant pump means includes threads cut into the surface of the crank body.

8. A gearless multiple spindle drive, including a drive crank comprising a drive shank and a crank body having an eccentric crank socket offset from the center of the drive shank to establish the throw of the drive crank, oscillator means received in said socket for oscillatory rotation relative to said crank body and for non-rotative circular translatory motion relative to surrounding space, the radii of the circular path of translation of points on the oscillator means being the same as the throw radius of the drive crank, a plurality of driven cranks with the same throw as the drive crank and drivingly engaged by said oscillator means, housing means restrained against rotation and carrying the shank of the driven cranks and carrying radial bearing means which rotatably support the drive crank, whereby constraints imposed on said oscillator means by the surrounding crank body portion of the drive crank, which is in turn constrained by said radial bearing means for the drive crank, resist the tendency of centrifugal force at high rotational speeds to cause slight increases in the throw radii of the drive crank and the driven cranks, tmeans to pump lubricating fluid from a reservoir defined by said housing means to said oscillator means within said eccentric crank socket, said lubricant pump means including threads cut into the surface of the crank body.

References Cited

UNITED STATES PATENTS

| | | | |
|---|---|---|---|
| 800,722 | 10/1905 | Crandall | 77—23 |
| 2,342,251 | 2/1944 | Burt | 77—22X |

FOREIGN PATENTS

| | | | |
|---|---|---|---|
| 965,946 | 9/1950 | France | 77—22 |

M. CARY NELSON, Primary Examiner

F. D. SHOEMAKER, Assistant Examiner

U.S. Cl. X.R.

77—22, 23